United States Patent [19]

David et al.

[11] 3,727,055
[45] Apr. 10, 1973

[54] OPTICAL POSITIONING SYSTEM
[75] Inventors: John Lewis David, Clinton; John Stafford Frichtel, Remsen; Lawrence Louis Zuppan, New Hartford, all of N.Y.
[73] Assignee: General Electric Company, Utica, N.Y.
[22] Filed: Sept. 24, 1970
[21] Appl. No.: 75,021

[52] U.S. Cl. .............. 250/83.3 H, 244/77 R, 250/224
[51] Int. Cl. ................................................. G01j 1/00
[58] Field of Search .................... 250/83.3 H, 83.3 R, 250/203 R, 224; 244/77 R, 77 A, 77 D

[56] References Cited

UNITED STATES PATENTS

| 3,549,109 | 12/1970 | Gilstrap | 244/77 R |
|---|---|---|---|
| 3,430,243 | 2/1969 | Evans | 250/83.3 R |
| 3,436,540 | 4/1969 | Lamorlette | 250/83.3 H |
| 3,423,051 | 1/1969 | Jakab | 250/83.3 H X |

Primary Examiner—Archie R. Borchelt
Attorney—Irving M. Freedman, Robert P. Cogan, Joseph B. Forman, Frank L. Neuhauser and Oscar B. Waddell

[57] ABSTRACT

A positioning system is provided for positioning one movable object carrying a detector unit with respect to another movable object carrying a source of radiation. The detector unit has an axis of symmetry of response to the radiation provided by the source. At least one output is provided by the detector unit indicative of an error angle in one degree of freedom, the error angle being defined as the angle between the axis of symmetry and a line drawn from the source to the detector unit. Relative positioning of the objects is controlled in response to the detector unit output.

12 Claims, 4 Drawing Figures

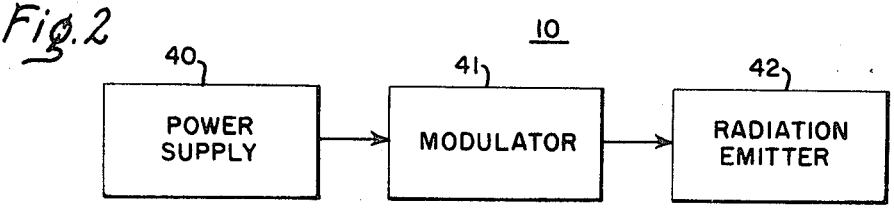
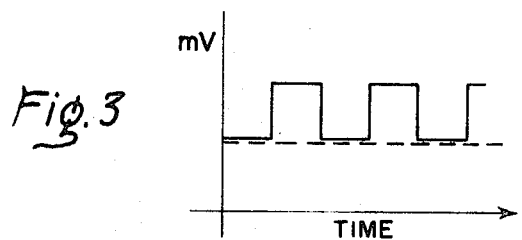
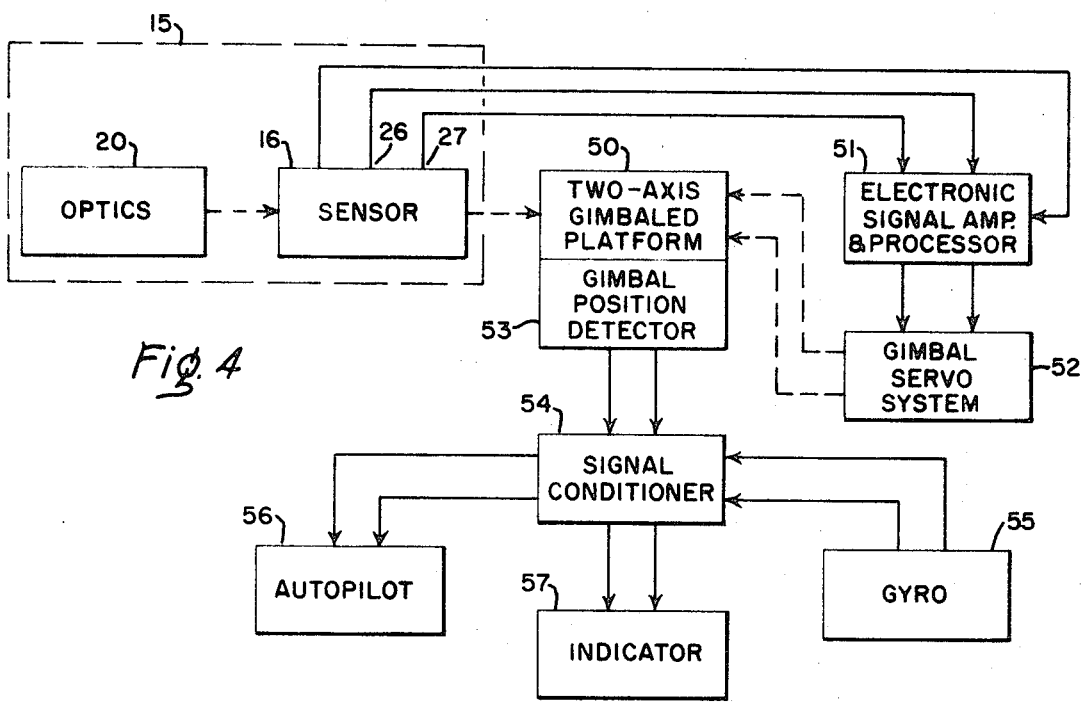

OPTICAL POSITIONING SYSTEM

BACKGROUND OF THE INVENTION

This invention relates to positioning systems. More specifically, it is related to positioning systems which are responsive to radiant energy.

This invention relates to a system for positioning a first movable object with respect to a second movable object. An example of such an application is the positioning of a helicopter having a cargo hoist over a sling load on the ground. The pilot must center the portion of the helicopter from which a cargo hook will descend directly over the load. The pilot, from his vantage point has no direct visual contact from the cargo hoist to the load. Further, during required hovering, the helicopter rotor wash picks up particles on the ground and circulates them through the rotor slip stream. The particles become entrained in a revolving air mass. In dusty terrain, the helicopter may become completely enshrouded, and the pilot may lose all ground reference. While the pilot can maintain a nearly level flight attitude by reference to aircraft flight instruments he cannot determine lateral drift. Therefore, he cannot correct the aircraft position with respect to the sling load to be attached. In addition to the difficulty in attaching the load, the aircraft is in danger of drifting into other objects. Further, there is a danger of coupling to the load in an off-center position which can cause the aircraft to roll from the load to crash. Ground-to-air directions are not satisfactory because the pilot cannot tell the speed and magnitude of repositioning movements when responding to the directions. Optical racking systems have been provided in the past. For example, see Patterson, Application of the Lateral Photoeffect to a Tracking System, Infrared Physics, 1962, Vol. 2, pp. 75-84. However, no system has heretofore been provided which will assure adequate positioning under the above-described circumstances. While it would be possible to provide a radar system which would respond to recognition of the pattern of a load, such a system would be both bulky and expensive.

SUMMARY OF THE INVENTION

It is therefore a general object of the present invention to provide a system for positioning a first movable object with respect to a second movable object which does not require visual contact by an operator of the system between the two objects.

It is another object of the present invention to provide a simplified and highly accurate system for relatively positioning first and second object.

It is a more specific object of the present invention to provide a positioning system in which first and second cooperative means are provided for use in conjunction with first and second movable objects respectively.

It is also an object of the present invention to provide a system of the type described utilizing a source of radiation including means for distinguishing radiation emitted thereby from background radiation.

Briefly stated, in accordance with the present invention, there is provided a simplified and accurate system for relatively positioning first and second movable objects. A source of radiation is provided for bearing by a first movable object. A detector unit is carried by a second movable object. The detector unit has an axis of symmetry of response and provides at least one output indicative of an error angle in one degree of freedom. The error angle is defined as the angle within a degree of freedom between the axis of symmetry and a line from the source of radiation to the detector. Means are provided for responding to the output of the detector unit, whereby relative positioning of the first and second movable objects is accomplished.

Brief Description of the Drawings

The means through which the foregoing objects and features of novelty are achieved are pointed out with particularity in the claims forming the concluding portion of the specification. The invention, both as to its organization and manner of operation, may be further understood by reference to the following drawings taken in connection with the following description.

Of the drawings:

FIG. 2 is a block diagrammatic representation of one form of radiation source for use in the system of FIG. 1;

FIG. 3 is a waveform chart illustrative of detector unit response to the radiation emitted by a source included in one form of the present invention and to nominal background radiation; and FIG. 4 is a block diagrammatic representation of one form of detector unit and control means for use in conjunction with the source of radiation illustrated in FIG. 2.

DESCRIPTION OF THE PREFERRED EMBODIMENTS

Figure 1:
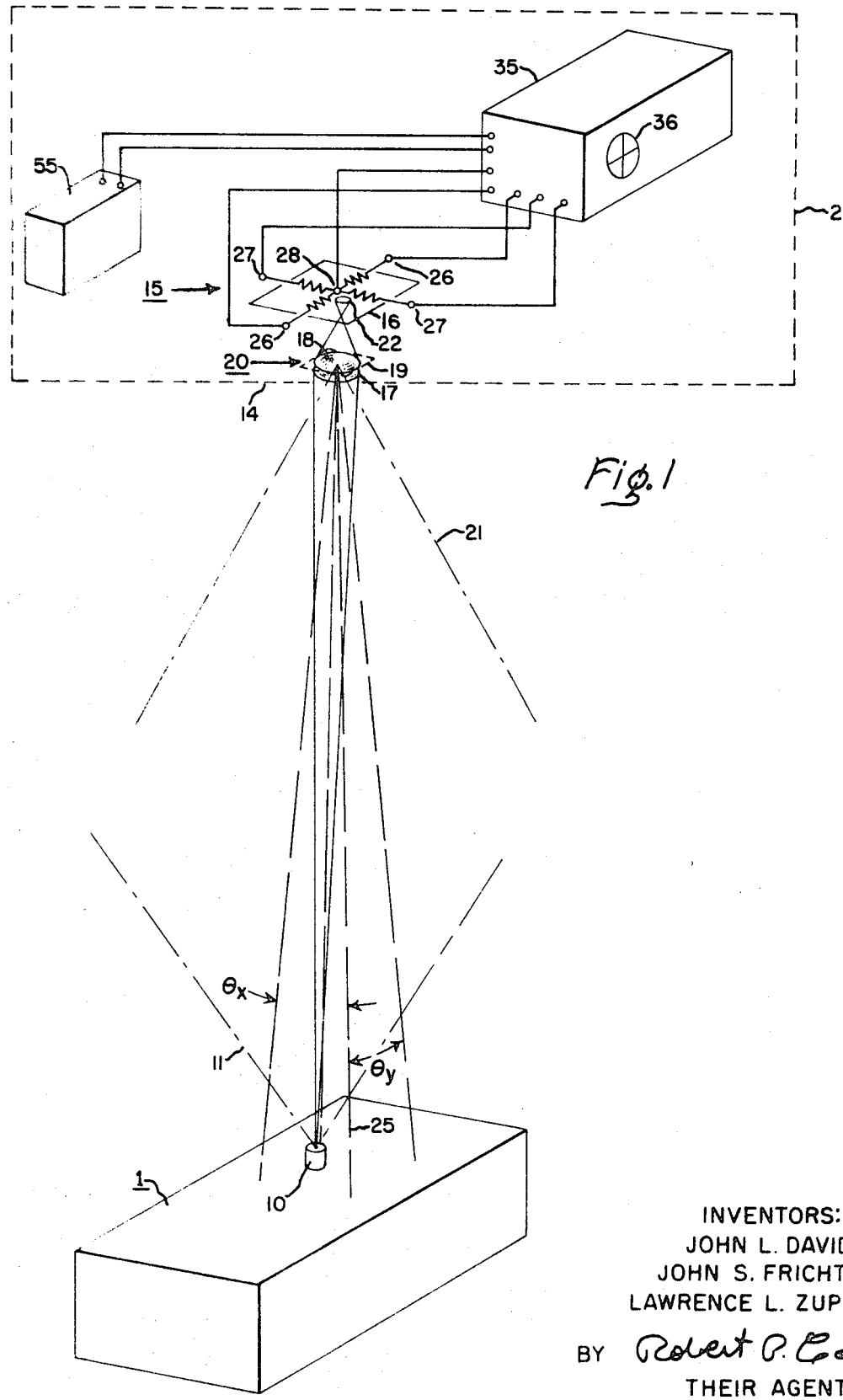
FIG. 1 is a pictorial representation of a system constructed in accordance with the present invention.

FIG. 1 is a pictorial illustration of a system constructed in accordance with the present invention for relatively positioning a first movable object, for example, a load 1, with respect to a second movable object, for example a helicopter 2. The load 1 is movable in that its location may change before commencement of operation of the system, after which he remains stationary. Alternatively, the load 1 may move during operation of the system, and the system will track it.

The system includes a source of radiation 10 which is borne by the load 1 and emits radiation. A detector unit 15, which is sensitive to the radiation emitted by the source 10 is carried at a portion 14 of the helicopter which portion 14 is desired to be aligned with the load 1. The portion 14 could comprise the portion of the helicopter from which a hook (not shown) for retrieving the load 1 is lowered, and the desired alignment may be maintaining the portion 14 directly over the load 1.

The type of radiation emitted by the source 10 is determined by the type of emitter included therein, for example an infra-red light-emitting diode. The source 10 includes means for making a radiation emitted thereby distinguishable from background radiation by the detector unit 15. This means for distinguishing the radiation emitted by the source 10 may conveniently comprise a modulator (further described with respect to FIGS. 2 and 3). The inclusion of means for distinguishing the radiation emitted by the source 10 from background radiation eliminates the need for complex distinguishing means within the detector unit 15, increasing the simplicity of the system. The emitter included within the source 10 comprises an optical point source. The term point source is used here not in its strictest optical sense, but rather to indicate that the source 10 is operable to provide a useful image in the detector unit 15 in the manner described below. The source 10 may emit radiation of the omnidirectional, or may incorporate optics to concentrate its radiant energy within a cone 11 having a field of view suitable for acquisation by the detector unit 15. The field of view is defined as the angle between two sides of a vertical cross-section of the cone 11.

The detector unit 15 comprises a sensor 16 and optics section 20, The optics section 20 includes a focusing means 18 having a principal plane 19 for focusing radiation on the sensor 16. One form of sensor 16 is described in Wallmark, A New Semiconductor Photocell Using Lateral Photoeffect, Proceedings of the I.R.E, 1957, Vol. 45, p. 474.

The focusing means 18 most conveniently comprises an optical lens. The detector unit 15 may have omnidirectional response. it is preferable, to include further optics 17 within the optics section 20 to provide the detector unit 15 with a field of view defined by a vertical cross section of a cone 21 within which the detector 15 is primarily responsive. The field of view of the detector unit 15 should be sufficiently broad for the convenient aquisition of the source 10, for example 60°. The field of view should not be narrow as in prior tracking systems for optimal operation. The further optics 17 may also include filters. For example, where an infra-red emitter is included in the source 10, it may be desired to include an infra-red filter in the further optics 17.

The sensor 16 has an axis of symmetry of response 25 and provides at least one output indicative of the position of a spot of light focused thereon with respect to axis 25. The sensor 16 may, for example, comprise a well-known quadrant detector having a first pair of output terminals 26 and a second pair of output terminals 27. In the present embodiment outputs appear at the terminal pairs 26 and 27 respectively indicative of the displacemenc of a spot of radiation on the surface of the sensor 16 and first AND second orthogonal degrees of freedom. An additional output, terminal 28 provides a normalizing signal indicative of the total radiation to which the sensor 16 responds.

When the source 10 is within a field of view of the detector unit 15 the focusing means 18 focuses radiation therefrom onto the surface of a detector unit 16. The sensor 16 may be placed in the focal plane (not shown) of the lens 18 (i.e., one focal length away from the principal plane 19). In this case, a point source 10 will be imaged on the sensor 16 as a point. Alternatively, the sensor 16 may be displaced from the lens 18 other than one focal length away to provide an image 22 of convenient size for utilization by the sensor 16. An image 22 of the position of the source 10 with respect to the axis 25 is thus provided. Consequently, the sensor 16 outputs are indicative of first and second error angles, denoted $\theta_x$ and $\theta_y$ in FIG. 1. Each error angle is defined as the angle between the axis 25 and a line drawn from the intersection of the principal plane 19 and the axis 25 to the source 10 within one of the orthogonal degrees of freedom. The angles $\theta_x$ and $\theta_y$ being equal to zero when the detector unit 15 is directly over the source 10.

The outputs of the detector unit 15 are provided to control means 35 responsive thereto. the control means 35 may include utilization means such as an automatic pilot system which may be preset to operate to null the error signals from the detector unit 15 for positioning the helicopter 2 and may also include utilization means such as an indicator 36. The indicator 36 has first and second crossed pointers respectively indicative of $\theta_x$ and $\theta_y$. A pilot (not shown) may respond to the indicator 36 for manually controlling the angular position of the helicopter 2 to the load 1. A gyroscope unit 55 may also be connected to the control means 35 to provide spatial reference signals.

One form which the source 10 may take is illustrated in block diagrammatic form in FIG. 2. In this embodiment, the source 10 comprises a power supply means 40, which, for example, could comprise a battery and switch. The power supply 40 provides an output to a modulator 41, the output of which is provided to the radiation emitter 42, for example an infra-red light-emitting diode. The modulator 41 may include means for voice modulation to facilitate communication with personnel in the helicopter 2. The response of a typical sensor 16 to a source 10 such as that of FIG. 2 is illustrated in FIG. 3. In FIG. 3, the abscissa is time and the ordinate is output energy units, for example, millivolts. The heavy waveform indicates response to the radiation of the source 10. It should be noted that any convenient waveform could be provided, the square wave being an illustrative example and a nominal operation frequency being 2–5 KHz. The dotted line represents response to ambient background radiation, which is substantially a direct current response. Since the response to the radiation of the source 10 is a waveform, the output of the detector unit 15 may be AC coupled to the control means 35 so that the control means 35 is non-responsive to background radiation.

FIG. 4 is illustrative of the portion of the system of the present invention which includes the detector unit 15. The same reference numerals denote elements corresponding to those of FIG. 1. Solid lines denote electrical connections and dotted lines note mechanical connections. In the embodiment of FIG. 4, the detector unit 15 is carried by a two-axis gimbaled platform 50 carried in the portion 15 of the helicopter 2. The outputs of the sensor 16 are provided to an electronic signal amplifier and processor 51 which is coupled to control a gimbal servo system 52. The electronic signal amplifier and processor 51 may include means for demodulating voice intelligence from radiation emitted by the source 10. The gimbal servo system 52 controls the spatial position of the gimbaled platform 50 in response to the outputs of the sensor 16. The positions of the gimbaled platform 50 are measured by a gimbal position detector 53 providing outputs indicative thereof to a signal conditioner 54. The gyroscope unit 55 provides electrical signals to the signal conditioner 54 to provide spatial referenced signals. The signal conditioner 54 provides output signals for coupling to utilization means such as an autopilot unit 56 and/or an aircraft indicator instrumentation 57 which is readily monitored by a pilot.

OPERATION OF THE SYSTEM

An example of the operation of the system is provided with respect to FIGS. 1 and 4. Let it be assumed that the helicopter 2 is approaching the pick-up point, i.e., the load 1, at 100 feet altitude, for example. An operator on the ground turns on the source 10 and places it at an attachment point on the load 1 for hoisting by the helicopter 2. Alternatively, the source 10 may be placed at a landing point for a precision landing of the helicopter 2. The detector unit 15 and the remainder of the system is actuated by the helicopter pilot. Initially, the control circuitry steers the gimbaled platform 50 directly down from the helicopter so that the axis 25 is vertically disposed.

Assume that both the source 10 and the detector unit 15 have an approximate 60° field of view. With the helicopter 2 at 100 feet altitude, an initial detection can be made from 50 feet laterally in any direction of approach. When an initial detection is made, the detector unit 15 is slewed immediately and locked on to track the source 10. As soon as the track is established, error signals are provided by the sensor 16. The control means 35 either actuates the autopilot 56 or enables the pilot to respond to the instrumentation 57. In this manner, the helicopter 2 is precisely located over the load 1.

The present invention thus contemplates a cooperative positioning system in which a source providing radiation distinguishable from background radiation cooperates with a detector which is responsive to regular error in order to precisely position a first movable object with respect to a second movable object.

What is claimed as new and desired to be secured by letters Patent of the United States is:

1. A positioning system comprising in combination:
   a. a source of radiation for bearing by a first movable object, said source of radiation including means for distinguishing radiation emitted by sensors from background radiation;
   b. a detector unit for bearing by a second movable object and having an axis of symmetry of response and comprising a sensor responsive to radiation of said source and focusing means having a principal plane, said focusing means focusing radiation on said sensor, said sensor providing at least one output indicative of an error angle in at least one degree of freedom, the error angle being defined as the angle between the axis of symmetry and a line from the source to the intersection of the axis of symmetry and the principal plane; and
   c. control means responsive to the at least one output of said detector unit for controlling the angular relationship of said detector unit and said source in at least one degree of freedom, whereby the first and second movable objects are relatively positioned.

2. The positioning system of claim 1 in which said sensor includes means for providing first and second outputs indicative of error angles in first and second orthogonal degrees of freedom respectively.

3. A positioning system according to claim 2 in which said control means comprises an electronic signal amplifier and processor connected to the outputs of said sensor, a gimbal servosystem connected to the output of said electronics signal amplifier and processor, a gimbaled platform for carrying said detector unit and mechanically coupled to said gimbal servo system, a gimbal position detector for providing an output signal indicative of the position of said gimbaled platform; a signal conditioner having a first input connected to the output of said gimbal position detector; a gyroscope unit providing a spatial reference signal to a second input of said signal conditioner, said signal conditioner providing a normalized output for coupling to utilization means.

4. A positioning system according to claim 1 in which said source of radiation comprises a source of power, an infra-red light-emitting diode, and a modulator coupled between said source of power and said light-emitting diode.

5. The positioning of system claim 4 in which said focusing means comprises an optical lens and an infra-red filter.

6. the positioning system of claim 4 in which said modulator includes means for voice modulation.

7. The positioning system of claim 4 in which said sensor includes means for providing first and second outputs respectively indicative of first and second error angles in orthogonal degrees of freedom.

8. A positioning system according to claim 7 in which said control means comprises a signal conditioner, an amplifier and signal processor having an input coupled to the outputs one output of said sensor and an output coupled to the first input of said signal conditioner, a gyroscope unit providing a spatial reference signal coupled to a second input of said signal conditioner, said signal conditioner providing a formalized output coupled to utilization means.

9. A positioning system according to claim 1 in which said second movable object comprises a helicopter.

10. The system of claim 9 in which said source includes means for modulating the radiation emitted by said source.

11. The system of claim 10 in which said control means includes aircraft indicator instrumentation for monitoring by a pilot.

12. The system of claim 11 in which said source includes an infra-red light emitting diode.

* * * * *